United States Patent
Li et al.

(10) Patent No.: US 10,716,031 B2
(45) Date of Patent: Jul. 14, 2020

(54) NETWORK NODE CONFIGURED TO PROVIDE WIRELESS ACCESS WITH ENHANCED RESOURCE ALLOCATION

(71) Applicant: NOKIA TECHNOLOGIES OY, Espoo (FI)

(72) Inventors: Zexian Li, Espoo (FI); Hamidreza Shariatmadari, Espoo (FI); Mikko Aleksi Uusitalo, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/374,896

(22) Filed: Apr. 4, 2019

(65) Prior Publication Data

US 2019/0313287 A1   Oct. 10, 2019

(30) Foreign Application Priority Data

Apr. 9, 2018   (FI) .................................. 20185335

(51) Int. Cl.
 *H04W 28/18*   (2009.01)
 *H04W 28/26*   (2009.01)
 *H04W 28/02*   (2009.01)
 *H04B 7/06*   (2006.01)
 *H04W 72/10*   (2009.01)
 (Continued)

(52) U.S. Cl.
 CPC .......... *H04W 28/18* (2013.01); *H04B 7/0632* (2013.01); *H04W 28/0268* (2013.01); *H04W 28/26* (2013.01); *H04W 72/0493* (2013.01); *H04W 72/10* (2013.01); *H04W 72/121* (2013.01); *H04W 72/1242* (2013.01)

(58) Field of Classification Search
 CPC ............. H04W 28/18; H04W 72/0493; H04W 72/1242; H04W 72/121; H04W 28/0268; H04W 28/26; H04W 72/10; H04B 7/0632
 See application file for complete search history.

(56) References Cited

U.S. PATENT DOCUMENTS

2010/0128614 A1*   5/2010   Kuusela ................ H04L 47/781
                                                 370/252
2016/0338078 A1*  11/2016   Wang .................. H04W 72/085
2017/0311182 A1   10/2017   Tenny et al.
(Continued)

FOREIGN PATENT DOCUMENTS

WO   WO 2018/009548 A1   1/2018
WO   WO 2018/054478 A1   3/2018

OTHER PUBLICATIONS

Communication of Acceptance under section 29a of Patents Decree dated Mar. 14, 2019 corresponding to Finnish Patent Application No. 20185335.

(Continued)

*Primary Examiner* — Christopher P Grey
(74) *Attorney, Agent, or Firm* — Squire Patton Boggs (US) LLP (57) ABSTRACT

When a network node providing wireless access and serving plurality of user devices receives information on channel conditions from one or more user devices, the network node determines available resources for traffic to and from the one or more user devices; and, when there is higher priority traffic, the network node uses reliability increasing resource allocation for the higher priority traffic at least as long as there are enough resources available.

10 Claims, 4 Drawing Sheets

(51) Int. Cl.
    *H04W 72/12*     (2009.01)
    *H04W 72/04*     (2009.01)

(56) References Cited

U.S. PATENT DOCUMENTS

2018/0234989 A1*  8/2018  Sun ...................... H04W 72/02
2018/0287843 A1* 10/2018  Chen ................... H04L 27/2602
2019/0215133 A1*  7/2019  Pan ..................... H04L 27/3488

OTHER PUBLICATIONS

German Office Action issued in corresponding German Patent Application No. 10 2019 109 109.8 dated Nov. 22, 2019.

* cited by examiner

NETWORK NODE CONFIGURED TO PROVIDE WIRELESS ACCESS WITH ENHANCED RESOURCE ALLOCATION

TECHNICAL FIELD

Various example embodiments relates to wireless communications.

BACKGROUND

In recent years the phenomenal growth of mobile services and proliferation of smart phones and tablets have increased a demand for higher network capacity. Future wireless networks, such as the $5^{th}$ Generation, 5G, is envisaged to expand and support diverse usage scenarios and applications with respect to current mobile network generations. One of the scenarios for 5G is ultra reliable low latency communications with strict requirements, especially in terms of latency and reliability.

BRIEF DESCRIPTION

According to an aspect, there is provided the subject matter of the independent claims. Some embodiments are defined in the dependent claims.

An aspect provides a network node configured to provide wireless access, the network node comprising: at least one processor; and at least one memory including computer program code; the at least one memory and computer program code configured to, with the at least one processor, cause the network node at least to perform: determining, in response to receiving information on channel conditions from one or more user devices, available resources for traffic to and from the one or more user devices; and using reliability increasing resource allocation for higher priority traffic at least as long as there are enough resources available.

In a further aspect, the at least one memory and computer program code configured to, with the at least one processor, further cause the network node of the above aspect at least to perform the reliability increasing resource allocation by selecting to the higher priority traffic a modulation coding scheme intended for more worse channel conditions than channel conditions indicated in the information on channel conditions received from a user device.

In a still further aspect, the at least one memory and computer program code configured to, with the at least one processor, further cause the network node of the above aspect at least to perform the reliability increasing resource allocation by using a channel quality index value with a lower value than a value indicated in the information on channel conditions received from the user device to select the modulation coding scheme.

In another aspect, the at least one memory and computer program code configured to, with the at least one processor, further cause, in response to enough resources not being available, the network node of any above aspects at least to perform shifting, in response to a mixed traffic load of higher priority traffic and non-higher priority traffic, resources from the non-higher priority traffic to the higher priority traffic; and using the reliability increasing resources allocation for higher priority traffic.

In a further aspect, the at least one memory and computer program code configured to, with the at least one processor, further cause the network node of the above aspect at least to perform the shifting by selecting a modulation coding scheme intended for better channel conditions than channel conditions indicated in the information on channel conditions received from the user device.

In a still further aspect, the at least one memory and computer program code configured to, with the at least one processor, further cause the network node of the above aspect at least to perform the shifting by using higher channel quality index values than those indicated in the information on channel conditions received from user devices with non-higher priority traffic to select the modulation coding scheme.

In an aspect, the at least one memory and computer program code configured to, with the at least one processor, further cause the network node of any above aspect at least to perform determining whether there is enough resources available by taking into account the additional resources needed by the reliability increasing resource allocation for higher priority traffic.

In another aspect, the at least one memory and computer program code configured to, with the at least one processor, further cause the network node of any above aspect at least to perform determining whether a traffic is higher priority traffic or non-higher priority traffic based on reliability level of the information on channel conditions and/or based on quality of service requirements of the traffic and/or based on whether the traffic is ultra reliable low latency communications service traffic.

In a further aspect, the at least one memory and computer program code configured to, with the at least one processor, further cause the network node of any above aspects at least to perform: treating ultra reliable low latency communications traffic as the higher priority traffic; and selecting amongst user devices with ultra reliable low latency communications traffic those user devices to which ultra reliable low latency communications traffic the reliability increasing resource allocation is used.

In a further aspect, the at least one memory and computer program code configured to, with the at least one processor, further cause the network node of the above aspect at least to perform the selecting based on reliability level of the information on channel conditions and/or based on reliability requirements of ultra reliable low latency communications service.

In a still further aspect, the at least one memory and computer program code configured to, with the at least one processor, further cause the network node of any above aspect at least to perform: treating ultra reliable low latency communications traffic as the higher priority traffic; and selecting, in response to enough resources not being available and all traffic being ultra reliable low latency communications traffic, user devices to which ultra reliable low latency communications traffic to use the reliability increasing resources allocation.

In a further aspect, the at least one memory and computer program code configured to, with the at least one processor, further cause the network node of the above aspect at least to perform the selecting based on reliability level of the information on channel conditions and/or based on reliability requirements of ultra reliable low latency communications service.

An aspect provides a method comprising: receiving, by a network node providing wireless access, information on channel conditions from one or more user devices; determining, by the network node, available resources for traffic to and from the one or more user devices; and using, by the network node, reliability increasing resource allocation for higher priority traffic at least as long as there are enough resources available.

In another aspect the method of above aspect further comprises, when there is not enough resources available and there is a mixed traffic load of higher priority traffic and non-higher priority traffic: shifting, by the network node, resources from the non-higher priority traffic to the higher priority traffic; and using, by the network node, the reliability increasing resources allocation for higher priority traffic.

In another aspect the method of any of above aspects further comprises, when there is not enough resources available: selecting, by the network node, one or more user devices amongst user devices with higher priority traffic, based on reliability level of the information on channel conditions received and/or based on reliability requirements of communications service used; and using the reliability increasing resources allocation to the one or more user devices selected.

An aspect provides a non-transitory computer readable medium comprising program instructions for causing an apparatus to perform at least the following: determining, in response to receiving information on channel conditions from one or more user devices, available resources for traffic to and from the one or more user devices; and using reliability increasing resource allocation for higher priority traffic at least as long as there are enough resources available.

An aspect provides a computer program comprising instructions for causing an apparatus to perform at least the following: determining, in response to receiving information on channel conditions from one or more user devices, available resources for traffic to and from the one or more user devices; and using reliability increasing resource allocation for higher priority traffic at least as long as there are enough resources available.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Embodiments and examples described herein may be implemented in any communications system comprising wireless connection(s). In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
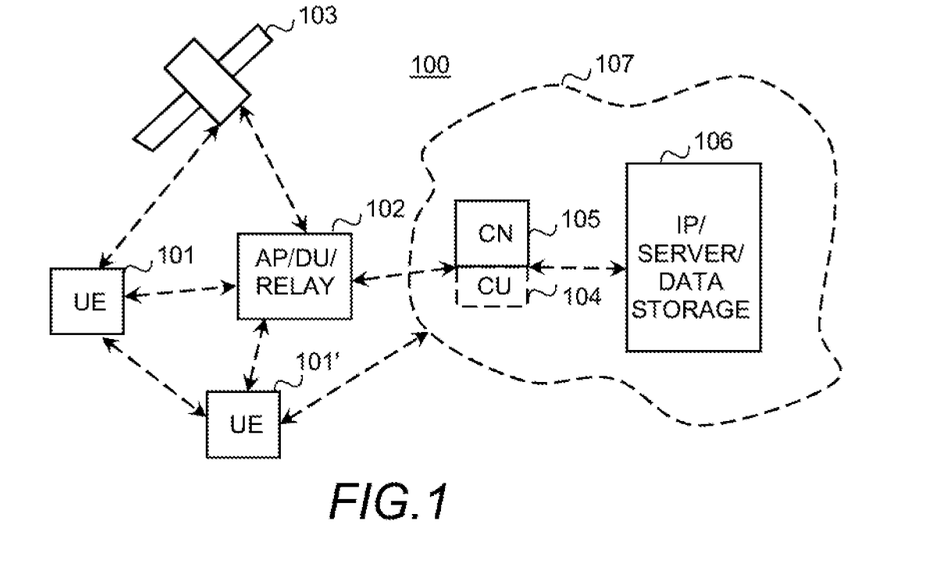
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. An example of an access node and a cell provided is described in more detail with FIG. 2. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point, next generation base station or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device and vehicle device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, operating over namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, the Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Below different exemplified examples are described using term base station as a generic term for network nodes configured to provide wireless access, such as gNBs. Further, in the below examples ultra reliable low latency communications (URLLC) service is used as an example of a higher priority service without limiting the examples to URLLC service.

Figure 2:
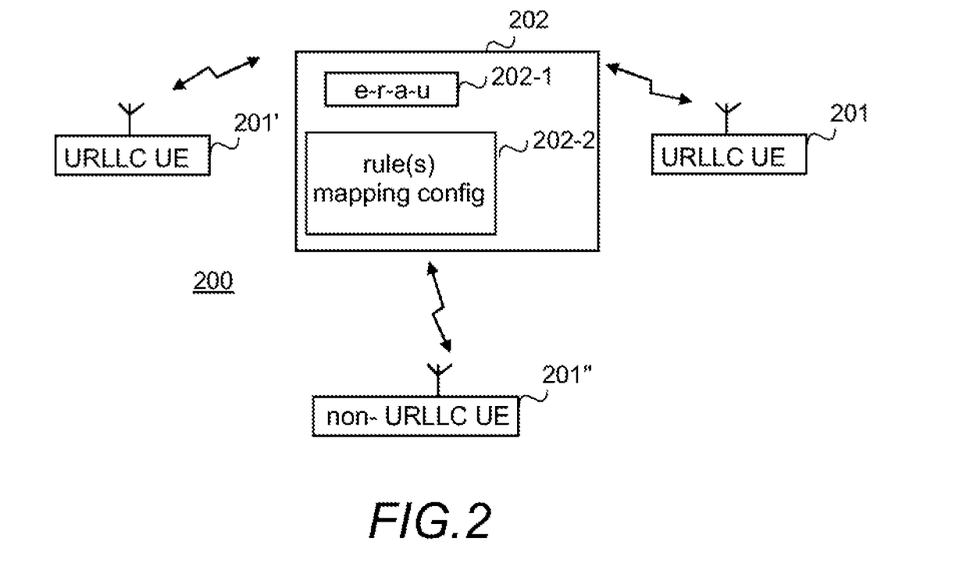
FIG. 2 is a schematic block diagram.

FIG. 2 illustrates an example of a base station 202 providing services to a plurality of user devices (UEs) 201, 201', 201" locating in the service area 200 of the base station. The user devices 201, 201', 201" may be configured to support ultra reliable low latency communications (URLLC) services. A URLLC service generally refers to a service that requires data communications from one end to another with ultra-high reliability and deadline-based low latency requirements. For example, the target for user plane latency may be 0.5 milliseconds for uplink, and 0.5 milliseconds for downlink with a reliability requirement of 99.999%. Herein, term "URLLC UE" is used for a user device that is requesting resources, and using them, for a URLLC service (causing URLLC traffic), and term "non-URLLC UE" is used for a user device that is requesting resources and using them for a service that is not a URLLC service (and causing non-URLLC traffic). In the examples below URLLC UE is used as a synonym to URLLC traffic and non-URLLC UE as a synonym to non-URLLC traffic.

The base station 202 is configured to implement reliability increasing resource allocation. For that purpose the base station comprises an enhanced resource allocation unit (e-r-a-u) 202-1, and in at least one memory 202-2 information needed for the reliability increasing resource allocation. In the illustrated example, the information comprises one or more mapping configurations and one or more rules utilizing the mapping configurations.

The mapping configurations define mappings between at least channel quality information and modulation coding scheme. Tables 1 to 3 illustrate different examples on mapping configurations that may be used when the base station is configured to allocate resources based on the mapping between channel quality indicator (CQI) index and transport block size, modulation scheme and coding rate, without restricting the mapping configurations to the illustrated examples. Further, there may different tables, or corresponding mapping configurations, for URLLC traffic and non-URLLC traffic. For example, table 1 may be used for non-URLLC traffic and table 3 to URLLC traffic. In the tables 1, 2 and 3, the modulation schemes include quadrature phase shift keying (QPSK) and Quadrature amplitude modulation (QAM) schemes. Naturally, other modulation schemes may be used. Further, the smaller the channel quality indicator index reported by a user device is, the lower is the radio channel quality detected by the user device.

TABLE 1

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 2

| CQI index | modulation | code rate × 1024 × $R^{CSI}$ | efficiency × $R^{CSI}$ |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |

TABLE 2-continued

| CQI index | modulation | code rate × 1024 × $R^{CSI}$ | efficiency × $R^{CSI}$ |
|---|---|---|---|
| 8 | 16QAM | 378 | 1.4766 |
| 9 | 16QAM | 490 | 1.9141 |
| 10 | 16QAM | 616 | 2.4063 |
| 11-15 | Reserved | Reserved | Reserved |

TABLE 3

| CQI index | modulation | code rate × 1024 | Efficiency |
|---|---|---|---|
| 0 | | out of range | |
| 1 | QPSK | 60 | 0.1172 |
| 2 | QPSK | 90 | 0.1758 |
| 3 | QPSK | 120 | 0.2344 |
| 4 | QPSK | 157 | 0.3066 |
| 5 | QPSK | 193 | 0.3770 |
| 6 | QPSK | 251 | 0.4902 |
| 7 | QPSK | 308 | 0.6016 |
| 8 | QPSK | 379 | 0.7402 |
| 9 | QPSK | 449 | 0.8770 |
| 10 | QPSK | 526 | 1.0273 |
| 11 | QPSK | 602 | 1.1758 |
| 12 | 16QAM | 340 | 1.3281 |
| 13 | 16QAM | 378 | 1.4766 |
| 14 | 16QAM | 490 | 1.9141 |
| 15 | 16QAM | 616 | 2.4063 |

The one or more rules define how to allocate resources when the reliability increasing resource allocation is in use. The rules may take into account requirements set to a communication for which the resources are allocated. For example, different requirements for end-to-end latency, jitter, survival time, communication service availability, reliability, user experienced data rate, payload size, traffic density, and/or service area dimension may be set for services provided. Further, URLLC is anticipated to bring requirements also on control channels, not only to data channels. When all that is taken into account, a number and variety of different rules may be set from simple ones to complex ones. Examples of different rules will be described in more detail below to illustrate the idea, without restricting the disclosed solutions to such rules.

The memory 202 may comprise one or more rules for determining whether or not there is sufficient amount of resources available. The base station is configured to keep track on the traffic load, and the one or more rules may utilize one or more thresholds stored to the memory. For example, a rule may be "98% of capacity". Another example include a rule "load is below the threshold if, when reliability increasing resource allocation is used for URLLC traffic, there are enough resources to user devices to use their services". It should be appreciated that the above are just examples and any other way to determine, whether the traffic load is low enough, i.e. whether there is sufficient amount of resources available, may be used.

Figure 3:
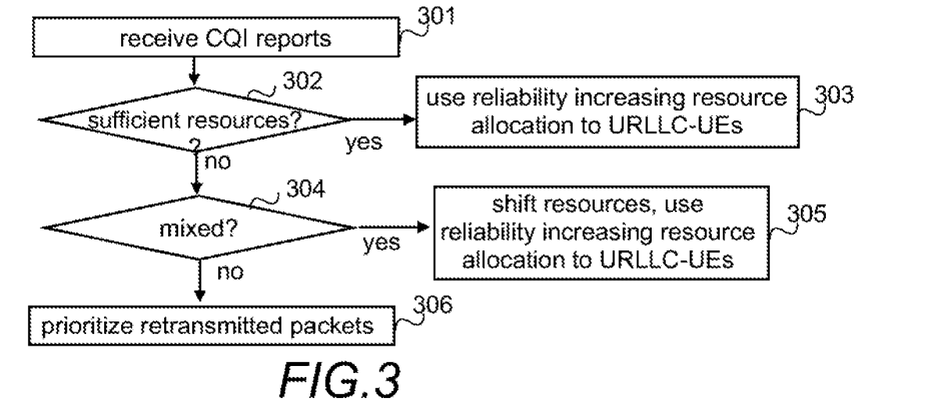
FIGS. 3 to 9 illustrate exemplified processes.
Figure 4:
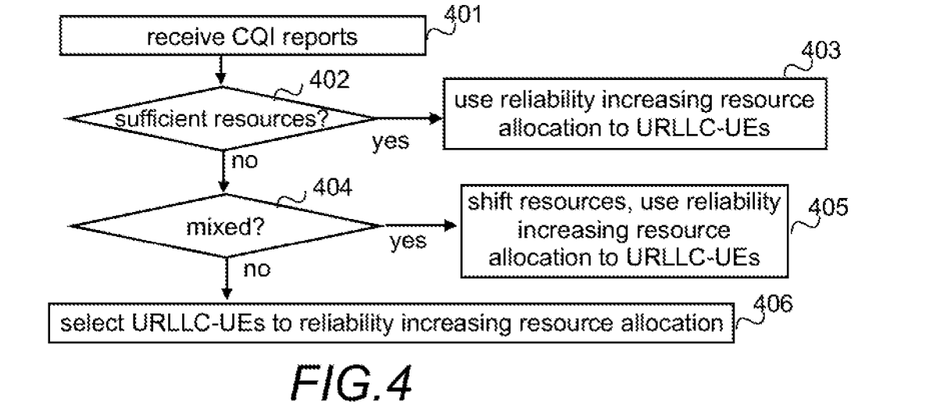
Figure 5:
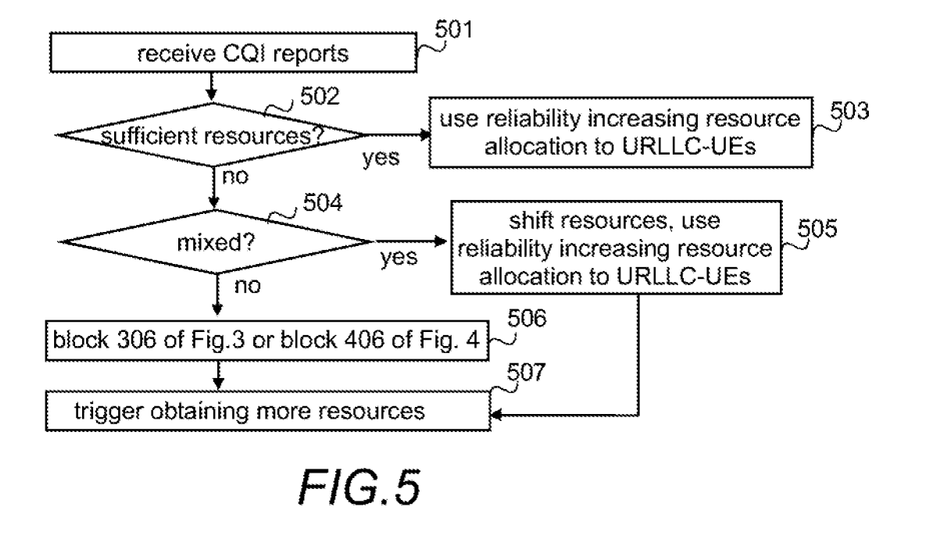

FIGS. 3, 4 and 5 illustrate different examples of how to implement the reliability increasing resource allocation in a base station. More precisely, they illustrate example functionalities of the enhanced resource allocation unit. In the examples, it is assumed that information on channel conditions at user devices are received in channel quality indicator reports. Naturally, any other corresponding way to convey the information on channel conditions may be used.

Figure 6:
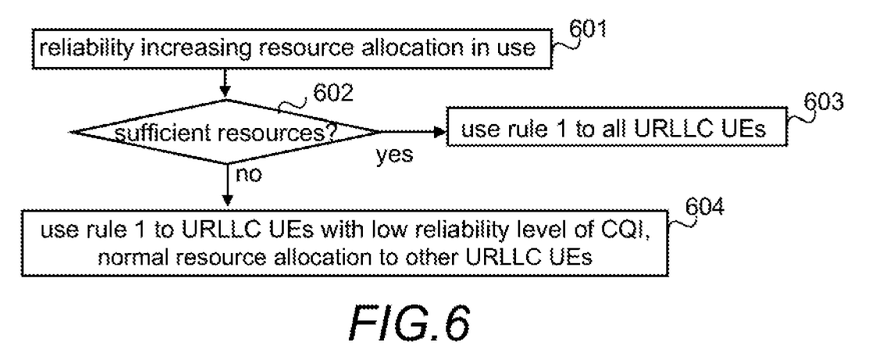
Figure 7:
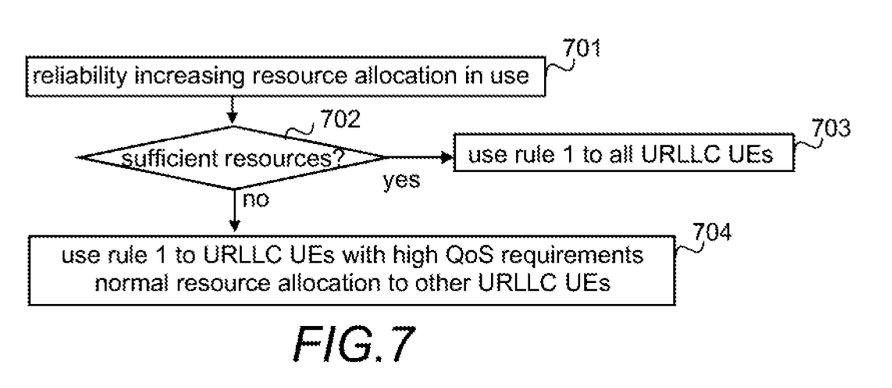

Referring to FIG. 3, channel quality indicator reports are received in block 301. If there is sufficient amount of resources available, i.e. a traffic load in the cell is low enough, (block 302: yes), reliability increasing resource allocation is used in block 303 to URLLC UEs. The reliability increasing resource allocation is performed using one or more rules. When resources are allocated based on the channel quality indicator index value, a simple rule may be that when the current CQI index value is 3 or more, for resource allocation a CQI index value, that is obtained by deducting 2 from the current CQI index value, is used, and if the current CQI index value is 2 or 1, CQI index value 1 is used. Another example of a rule includes that the above rule is used if there are enough resources available, but if not, then from the current CQI index value 1 is deducted instead of 2. Further examples are illustrated in FIGS. 6 and 7. For non-URLLC UEs no change in resource allocation is needed.

If the traffic load is higher, i.e. there is not sufficient amount of resources available, (block 302: no), it is checked in block 304, whether the traffic is a mixed traffic comprising both URLLC traffic and non-URLLC traffic. In other words, it is checked, whether or not the traffic load is caused by a mixture of URLLC-UEs and non-URLLC UEs. If there is mixed traffic (block 304: yes), resources are shifted in block 305 from non-URLLC traffic to URLLC traffic, and reliability increasing resource allocation is used in block 305 to URLLC-UEs. The reliability increasing resource allocation in block 305 may be performed using the same one or more rules as in block 303, or different rules may be applied. The non-URLLC resources may be shifted according to one or more rules. For example, when resources are allocated based on the channel quality indicator index value, a simple rule may be that the current CQI index value is incremented by one unless it is the highest value. Another example includes that the current CQI index value is incremented by one when it is 8 or less. Shifting the resources in block 305 causes that a little bit less resources are allocated to non-URLLC UEs and there may be one or more rules according to which the resource allocation to non-URLLC UEs is performed. The operation of block 305 will result to better performance, for example less retransmissions, for URLLC traffic while it may introduce longer delay for non-URLLC traffic, caused by a possible increase in retransmissions, for example. However, usually non-URLLC traffic is not so sensitive to longer delays, and therefore a longer delay is most likely not a problem.

In the illustrated example it is assumed, for the sake of clarity, that when there is a heavy load, i.e. not sufficient amount of resources available, and there is no mixed traffic (block 304: no), the traffic is then URLLC traffic. In such a situation retransmitted packets are prioritized in block 306.

The example illustrated in FIG. 4 differs from the one illustrated in FIG. 3 in that respect, how the heavy load with only URLLC traffic is handled. In other words, blocks 401-405 correspond to blocks 301-305, correspondingly, and they are not repeated herein.

Referring to FIG. 4, when there is a heavy (block 402: no) URLLC traffic (block 404: no), one or more of the URLLC UEs are selected in block 406, according to one or more rules, to reliability increasing resource allocation. In other words, for the selected user device(s) the reliability increasing resource allocation is used. The same principles to select the user devices that are described in FIGS. 6 and 7 may be used also herein.

FIG. 5 illustrates a further example how the heavy load traffic may be handled. In the illustrated example, blocks 501-504 corresponds to blocks 301-304 of FIG. 3, or blocks 401-404 of FIG. 4, and the description relating to the blocks is not repeated herein in vain.

Referring to FIG. 5, when there is a heavy (block 502: no) URLLC traffic (block 504: no), in addition to either prioritizing retransmitted packets (block 306 of FIG. 3) or selecting one or more of the user devices, to reliability increasing resource allocation (block 406 of FIG. 4), obtaining more resources is triggered in block 507. For example, activating of new spectral band(s) or activating more sites may be triggered.

Further, in the illustrated example, shifting the resources (block 505) causes that the process proceeds to block 507 to trigger obtaining more resources.

In another implementation, based on the example of FIG. 5, shifting the resources does not trigger obtaining more resources.

FIGS. 6 and 7 illustrate examples how the base station, or more precisely, the enhanced resource allocation unit, may be configured to implement the reliability increasing resource allocation. In the examples, the reliability increasing resource allocation comprises a basic reliability increasing resource allocation and a selective reliability increasing resource allocation. In the illustrated examples, the basic reliability increasing resource allocation means reliability increasing resource allocation that can be used for all URLLC UEs, either because the traffic load is low or because by shifting enough resources will be available. The selective reliability increasing resource allocation is used in the examples when the traffic load is heavy. It should be appreciated that in other implementations, the reliability increasing resource allocation may be implemented always as the selective reliability increasing resource allocation. Further, in the examples it is assumed, for the sake of clarity that a rule 1 is used for implementing the reliability increasing resource allocation, without limiting the examples to such a solution. Examples of the rule 1 include examples given above with FIG. 3.

Referring to FIG. 6, when the reliability increasing resource allocation is in use (block 601), and there is sufficient amount of resources available to implement the basic reliability increasing resource allocation (block 602: yes), the rule 1 is used to allocate resources to all URLLC UEs, for example as described above. For example, assuming that 10 physical resource blocks (PRBs) are needed for transmitting user data, and applying the rule 1 will mean that 20 PRBs are needed, and there is 20 PRBs or more free, there is sufficient amount of resources available.

However, if there is not sufficient amount of resources available (block 602: no), the selective reliability increasing resource allocation will be used in block 603. In the illustrated example of FIG. 6, the selective reliability increasing resource allocation means that those URLLC UEs, with channel quality information (CQI) indicating that its reliability is low, are selected to be the URLLC UEs to which the rule 1 will be applied, resources to other URLLC UEs are allocated according to normal/legacy resource allocation. (Including possibility to prioritize resending of packets.) For example, signal-to-interference-plus-noise ratio (SINR) may be used to determine the reliability of the channel quality indicator information, and a URLLC UE reporting a SINR value below a preset threshold may be selected to the reliability increasing resource allocation. In another example, as many URLLC UEs as possible are selected to the reliability increasing resource allocation according to their SINR values, starting from the lowest one.

Applying the reliability increasing resource algorithm with more robust modulation scheme to user devices with low reliability channel quality information, the inaccuracy, including a possibility that the CQI index is wrongly decoded as a higher or lower value, may be compensated.

The example of FIG. 7 differs from the example of FIG. 6 in the principles according to which URLLC UEs to reliability increasing resource allocation are selected. In other words, blocks 701-703 corresponds to blocks 601-603 of FIG. 6, and the description relating to the blocks is not repeated herein.

Referring to FIG. 7, if there is not sufficient amount of resources available (block 702: no), the selective reliability increasing resource allocation will be used in block 703. In the illustrated example of FIG. 7, the selective reliability increasing resource allocation means that that those URLLC UEs using URLLC services with high quality of service (QoS) requirements, are selected to be the URLLC UEs to which the rule 1 will be applied, resources to other URLLC UEs are allocated according to normal/legacy resource allocation. (Including possibility to prioritize resending of packets.) For example, if a quality of service requirement of a URLLC UE exceeds a preset level, the URLLC UE is selected, otherwise not. In another example, as many URLLC UEs that is possible are selected to the reliability increasing resource allocation according to their quality of service requirements, starting from the highest one.

Figure 8:
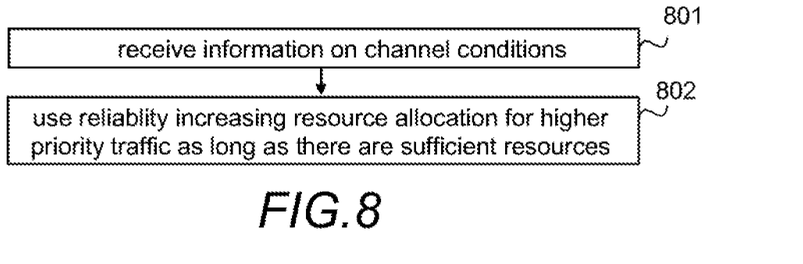
Figure 9:
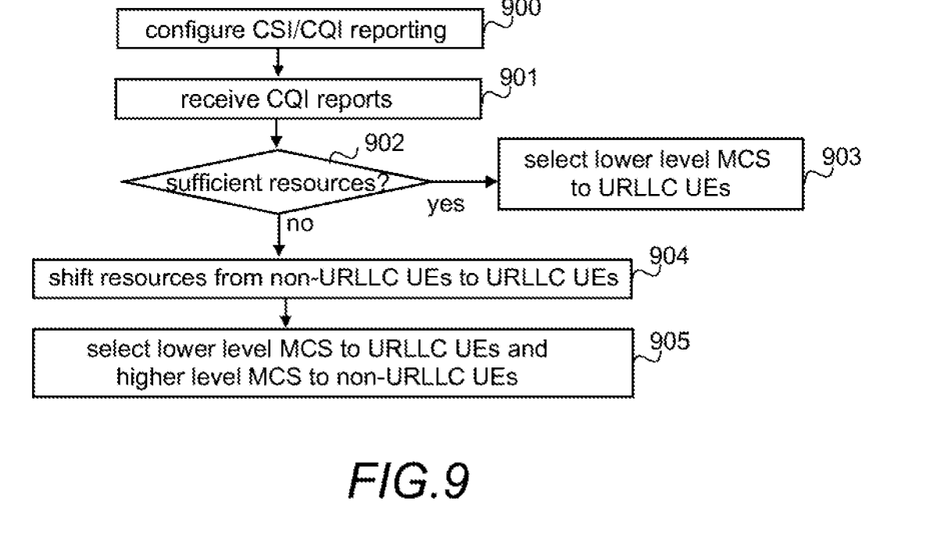

FIGS. 8 and 9 illustrate further examples of how to implement the reliability increasing resource allocation in a base station. More precisely, they illustrate example functionalities of the enhanced resource allocation unit.

Referring to FIG. 8, when information on channel conditions at user devices are received in block 801, reliability increasing resource allocation is used for higher priority traffic in block 802 at least as long as there is enough resources available (i.e. there is a sufficient amount of resources available, taking into account that the reliability increasing resource allocation increases resources needed for the traffic, compared to required resources with "normal" resource allocation). Examples how to determine higher priority traffic are described below with FIG. 10.

Referring to FIG. 9, the process starts with the base station configuring in block 900 user devices for channel status information (CSI) and channel quality indicator (CQI) reporting. It should be appreciated that a corresponding functionality is performed with the other examples described above, even though not explicitly disclosed. When channel quality indicator (CQI) reports are received in block 901, it is checked in block 902, whether there is a sufficient amount of resources available. If there is sufficient amount of resources available (block 902: yes), a lower level modulation scheme than the one, which would be selected based on a corresponding channel quality indicator report, is selected in block 903 to URLLC UEs. In other words, the reliability increasing resource allocation is performed by selecting a more robust modulation scheme than a modulation scheme, which would be selected based on the information in the report. Thanks to that, better reliability is achieved for URLLC traffic.

The amount how much a level selected for the modulation coding scheme in the reliability increasing resource allocation is lowered (i.e. a back-off level) may be determined according to a delay window between the last reported CQI and a corresponding user device, and/or according to the reliability requirements and/or the latency requirements. For example, when a delay window becomes larger, it is more probable that the channel has become worse. Hence, the modulation code scheme selection for a lower level channel conditions may help to compensate the delay of CQI report. In other words, more back-off may be applied to user devices with less reliable CQI report and/or to user devices using services with more stringent quality of service (QoS) requirements.

If there is not sufficient amount of resources available, (block 902: no), resources are shifted in block 904 from non-URLLC traffic to URLLC traffic (i.e. from non-URLLC UEs to URLLC UEs). Further, a lower level modulation scheme than the one, which would be selected based on a corresponding channel quality indicator report, is selected in block 905 to URLLC UEs and a higher level modulation scheme than the one, which would be selected based on a corresponding channel quality indicator report, is selected in block 905 to non-URLLC UEs. In other words, the reliability increasing resource allocation is performed by selecting a more robust modulation scheme than a modulation scheme, which would be selected based on the information in the report, to URLLC traffic and a less robust modulation scheme selected to non-URLLC traffic shifts the resources.

Figure 10:
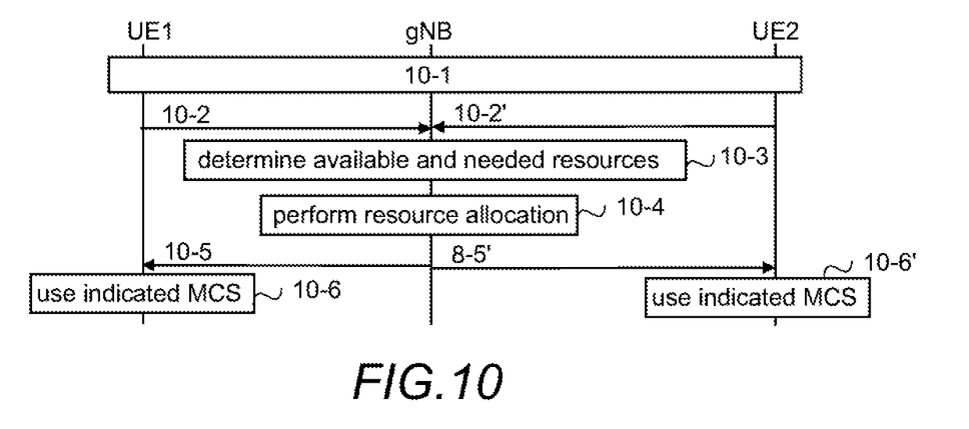
FIG. 10 illustrates information exchange.

FIG. 10 illustrates an example of information exchange. In the illustrated example channel state information is used as an example of information on channel conditions. In FIG. 10, UE1 and UE2 illustrate user devices and gNB illustrates a base station serving the user devices.

Referring to FIG. 10, in point 10-1 reporting of channel state information is configured between the user devices and the base station. Then the base station receives in messages 10-2, 10-2' channel state information from the user devices, determines in point 10-3 available resources, and performs resource allocation in point 10-4 correspondingly. The performed resource allocation may contain reliability increasing resource allocation. Further, the resource allocation may select, using one or more rules, the traffic (user devices) for which the apply reliability increasing resource allocation. The selection may performed based on service type: in the above examples the reliability increasing resource allocation is performed to URLLC traffic. Another example may be that the reliability increasing resource allocation is performed to high priority communications. (The high priority may be determined by Quality of Service parameters, or indicated in another way.) Still further examples include that the reliability increasing resource allocation is used for traffic which CQI report reliability is below a certain reliability and/or one or more of quality of service (QoS) requirements are above corresponding limit(s). The selection may use other information, or additional information like: if resources are available, use the reliability increasing resource allocation for all traffic, then determine priority order of the traffic and use the priority order to select (determine) traffic to which use the reliability increasing resource allocation. The priority order may be determined using reliability of CQI reports and/or quality of service (QoS) requirements. For example, lowering reliability of CQI reports increases priority. Then information on the resource allocation is sent in messages 10-5, 10-5' to user devices. The user devices then use in point 10-6, 10-6' the modulation coding scheme indicated in the resource allocation.

Different scenarios to illustrate the reliability increasing resource allocation are described below with the example of FIG. 10, and with following assumptions: reliability increasing resource allocation is used for URLLC traffic (i.e. the higher priority traffic is URLLC traffic), table 3 is used as the mapping configuration in resource allocation for both URLLC and non-URLLC traffic, both user devices report in messages 10-2, 10-2' that their channel quality indicator index is 6, reliability increasing resource allocation is applied by decreasing the value of the channel quality indicator index by 2, and when resources are shifted, shifting is applied by increasing the value of the channel quality indicator index by 1. With the assumptions a normal/legacy operation, i.e. no reliability increasing resource allocation, would mean that the selected modulation scheme is 2 with code rate 251/1024.

The scenarios are:
UE1 is a URLLC UE and UE2 is a non-URLLC UE, in point 10-3 it is determined that there are enough available resources for applying reliability increasing resource allocation for UE1, therefore in point 10-4 CQI index value 4 is used for UE1 and CQI index value 6 for UE2 (UE2 is following the normal operation), message 10-5 conveys resource allocation according to CQI index 4, message 10-5' conveys resource allocation according to CQI index 6. As a result UE1 uses modulation scheme QPSK with code rate 157/1024 and UE2 uses modulation scheme QPSK with code rate 251/1024. More resources are allocated to UE1 when the reliability increasing resource allocation is used compared to normal operation (without the reliability increasing resource allocation), without any adverse affect to resources allocated to UE2. This means for UE1 that better reliability performance may be achieved, a latency may be improved (become shorter).

UE1 is a URLLC UE and UE2 is a non-URLLC UE, in point 10-3 it is determined that there is not enough available resources for applying reliability increasing resource allocation for UE1 without shifting the resources and shifting is possible (mixed traffic), therefore in point 10-4 CQI index value 4 is used for UE1 and CQI index value 7 for UE2, message 10-5 conveys resource allocation according to CQI index 4, message 10-5' conveys resource allocation according to CQI index 7. As a result UE1 uses modulation scheme QPSK with code rate 157/1024 and UE2 uses modulation scheme 16QAM with code rate 308/1024. More resources are allocated to UE1 when the reliability increasing resource allocation is used compared to the normal operation, and less resources are allocated to UE2 compared to the normal operation. This means for UE1 that better reliability performance may be achieved, and a latency may be improved (become shorter). On the other hand, for UE2 this means that failure detection may be increased increasing possibility to retransmissions.

UE1 and UE2 are URLLC UEs, in point 10-3 it is determined that there are enough available resources for applying reliability increasing resource allocation for UE1 and UE2, therefore in point 10-4 CQI index value 4 is used for UE1 and UE2, message 10-5 conveys resource allocation according to CQI index 4, message 10-5' conveys resource allocation according to CQI index 4. As a result UE1 uses modulation scheme QPSK with code rate 157/1024 and UE2 uses modulation scheme QPSK with code rate 157/1024. More resources are allocated to both UE1 and UE2 when the reliability increasing resource allocation is used compared to normal operation (without the reliability increasing resource allocation). This means for UE1 and UE2 that better reliability performance may be achieved and a latency may be improved (become shorter).

UE1 and UE2 are URLLC UEs, in point 10-3 it is determined that there are not enough available resources for applying reliability increasing resource allocation for UE1 and UE2, therefore in point 10-4 one of the UE1 and UE2 is selected, in the example based on reliability levels of the two CQI reports, CQI report from UE1 has a lower reliability level, and therefore CQI index value 4 is used for UE1 and CQI index value 6 for UE2 (UE2 is following the normal operation), message 10-5 conveys resource allocation according to CQI index 4, message 10-5' conveys resource allocation according to CQI index 6. As a result UE1 uses modulation scheme QPSK with code rate 157/1024 and UE2 uses modulation scheme QPSK with code rate 251/1024. More resources are allocated to UE1 when the reliability increasing resource allocation is used compared to normal operation (without the reliability increasing resource allocation), without any adverse affect to resources allocated to UE2. This means for UE1 (with more worse channel conditions) that better reliability performance may be achieved, and a latency may be improved (become smaller).

As is evident from the above examples, the reliability increasing resource allocation improves latency and reliability performance for URLLC services, and provides better (more efficient) resource usage, especially when there is sufficient amount of resources available.

The blocks, points, related functions, and information exchanges described above by means of FIGS. 3 to 10 are in no absolute chronological order, and some of them may be performed simultaneously or in an order differing from the given one. Other functions can also be executed between them or within them, and other information may be sent, and/or other rules applied. Some of the blocks/points or part of the blocks/points or one or more pieces of information can also be left out or replaced by a corresponding block or part of the block or one or more pieces of information. For example, the principles disclosed above may be applied to control traffic as well.

Although in the above term "reliability increasing resource allocation" is used for the proposed way to process higher priority traffic, using URLLC traffic as an example, it should be appreciated that any other term, for example aggressive resource allocation, or aggregative resource allocation, may be used.

The techniques and methods described herein may be implemented by various means so that an apparatus/device configured to support encoding and/or decoding mechanism based on at least partly on what is disclosed above with any of FIGS. 1 to 10, including implementing one or more functions/operations of a corresponding base station (network node configured to provide wireless access, device) described above with an embodiment/example, for example by means of any of FIGS. 2 to 10, comprises not only prior art means, but also means for implementing the one or more functions/operations of a corresponding functionality described with an embodiment, for example by means of any of FIGS. 2 to 10, and it may comprise separate means for each separate function/operation, or means may be configured to perform two or more functions/operations. For example, one or more of the means and/or the enhanced resource allocation unit, or its sub-units, described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, decoder circuitries, encoder circuitries, other electronic units designed to perform the functions described herein by means of FIGS. 1 to 10, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 11:
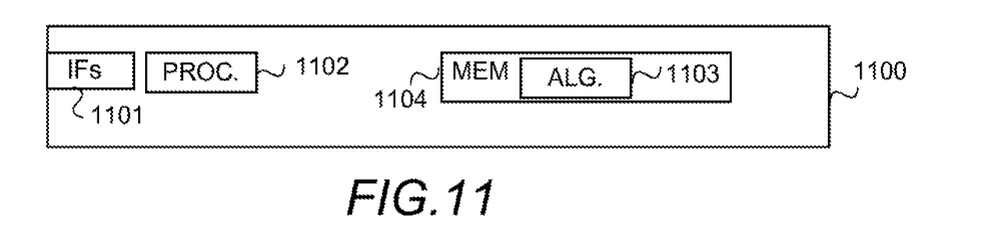
FIG. 11 is a schematic block diagram.

FIG. 11 provides an apparatus (device, network node) according to some embodiments of the invention. FIG. 11 illustrates an apparatus configured to carry out at least the functions described above in connection with the base station. In other words, the apparatus 1100 of FIG. 11 depicts a network node configured to provide wireless access according to what is described above. Each apparatus 1100 may comprise one or more communication control circuitry, such as at least one processor 1102, and at least one memory 1104, including one or more algorithms 1103, such as a computer program code (software) wherein the at least one memory and the computer program code (software) are configured, with the at least one processor, to cause the apparatus to carry out any one of the exemplified functionalities of the device described above.

Referring to FIG. 11, at least one of the communication control circuitries in the apparatus 1100 is configured to provide the enhanced resource allocation unit or its sub-units, and to carry out functionalities of a base station described above by means of any of FIGS. 3 to 10 by one or more circuitries.

Referring to FIG. 11, the memory 1104 may be implemented using any suitable data storage technology, such as semiconductor based memory devices, flash memory, magnetic memory devices and systems, optical memory devices and systems, fixed memory and removable memory.

Referring to FIG. 11, the apparatus may further comprise different interfaces 1101 such as one or more communication interfaces (TX/RX) comprising hardware and/or software for realizing communication connectivity over the medium according to one or more communication protocols. The one or more communication interfaces may provide the apparatus with communication capabilities to communicate in the cellular communication system and enable communication to/from terminal devices and to/from different network nodes, for example. The communication interface may comprise standard well-known components such as an amplifier, filter, frequency-converter, (de)modulator, and encoder/decoder circuitries, controlled by the corresponding controlling units, and one or more antennas. The communication interfaces may comprise radio interface components providing the device with radio communication capability in a cell. The communication interfaces may comprise optical interface components providing the device with optical fibre communication capability.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a base station, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for a base station, or other computing device or network device.

In embodiments, the at least one processor, the memory, and the computer program code form processing means or comprises one or more computer program code portions for carrying out one or more operations according to any one of the embodiments of FIGS. 3 to 10 or operations thereof.

Embodiments as described may also be carried out in the form of a computer process defined by a computer program or portions thereof. Embodiments of the methods described in connection with FIGS. 2 to 10 may be carried out by running at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A network node configured to provide wireless access, the network node comprising:
   at least one processor; and
   at least one memory including computer program code;
   the at least one memory and computer program code configured to, with the at least one processor, cause the network node at least to perform:
   keeping track on traffic load;
   determining, in response to receiving information on channel conditions from one or more user devices, based on the traffic load, available resources for traffic to and from the one or more user devices;
   using, instead of normal resource allocation for higher priority traffic, the normal resource allocation being based on channel conditions indicated in the information on channel conditions, reliability increasing resource allocation for the higher priority traffic at least as long as there are, based on the traffic load, enough resources available; and
   shifting, in response to enough resources not being available and a mixed traffic load of higher priority traffic and non-higher priority traffic, resources from the non-higher priority traffic to the higher priority traffic, the shifting including allocating resources to the non-higher priority traffic assuming better channel conditions than those indicated in the information on channel conditions, and continuing the using the reliability increasing resource allocation for the higher priority traffic, wherein different amounts of resources are shifted for the mixed traffic than for different transmissions of the higher priority traffic when the higher priority traffic is present without the non higher priority traffic.

2. The network node of claim 1, wherein the at least one memory and computer program code are configured to, with the at least one processor, further cause the network node at least to perform determining whether there is enough resources available by taking into account the additional resources needed by the reliability increasing resource allocation for higher priority traffic.

3. The network node of claim 1, wherein the at least one memory and computer program code are configured to, with the at least one processor, further cause the network node at least to perform:
   treating ultra reliable low latency communications traffic as the higher priority traffic; and
   selecting amongst user devices with ultra reliable low latency communications traffic those user devices to which ultra reliable low latency communications traffic the reliability increasing resource allocation is used.

4. The network node of claim 1, wherein the at least one memory and computer program code are configured to, with the at least one processor, further cause the network node at least to perform:
   treating ultra reliable low latency communications traffic as the higher priority traffic; and
   selecting, in response to enough resources not being available and all traffic being ultra reliable low latency communications traffic, user devices to which ultra reliable low latency communications traffic to use the reliability increasing resources allocation.

5. The method of claim 1, further comprising, when there is not enough resources available:
   selecting, by the network node, one or more user devices amongst user devices with the higher priority traffic, based on reliability level of the information on channel conditions received or based on reliability requirements of communications service used; and
   using the reliability increasing resource allocation to the one or more user devices selected.

6. A computer program embodied on a non-transitory computer readable medium, said program comprising program instructions for causing an apparatus to perform at least the following:
   keeping track on traffic load;
   determining, in response to receiving information on channel conditions from one or more user devices, based on the traffic load, available resources for traffic to and from the one or more user devices;

using, instead of normal resource allocation for higher priority traffic, the normal resource allocation being based on channel conditions indicated in the information on channel conditions, reliability increasing resource allocation for the higher priority traffic at least as long as there are, based on the traffic load, enough resources available; and shifting, in response to enough resources not being available and a mixed traffic load of higher priority traffic and non-higher priority traffic, resources from the non-higher priority traffic to the higher priority traffic, the shifting including allocating resources to the non-higher priority traffic assuming better channel conditions than those indicated in the information on channel conditions, and continuing the using the reliability increasing resource allocation for the higher priority traffic, wherein different amounts of resources are shifted for the mixed traffic than for different transmissions of the higher priority traffic when the higher priority traffic is present without the non higher priority traffic.

7. A network node configured to provide wireless access, the network node comprising:

at least one processor; and at least one memory including computer program code;

the at least one memory and computer program code configured to, with the at least one processor, cause the network node at least to perform:

keeping track on traffic load;

determining, in response to receiving information on channel conditions from one or more user devices, based on the traffic load, available resources for traffic to and from the one or more user devices;

using, instead of normal resource allocation for higher priority traffic, the normal resource allocation being based on channel conditions indicated in the information on channel conditions, reliability increasing resource allocation for the higher priority traffic at least as long as there are, based on the traffic load, enough resources available, wherein the reliability increasing resource allocation is performed by selecting to the higher priority traffic a modulation coding scheme intended for more worse channel conditions than channel conditions indicated in the information on channel conditions received from a user device, wherein the reliability increasing resource allocation is performed by using a channel quality index value with a lower value than a value indicated in the information on channel conditions received from the user device to select the modulation coding scheme; and shifting, in response to enough resources not being available and a mixed traffic load of higher priority traffic and non-higher priority traffic, resources from the non-higher priority traffic to the higher priority traffic, the shifting including allocating resources to the non-higher priority traffic assuming better channel conditions than those indicated in the information on channel conditions, and continuing the using the reliability increasing resource allocation for the higher priority traffic.

8. A network node configured to provide wireless access, the network node comprising:

at least one processor; and at least one memory including computer program code;

the at least one memory and computer program code configured to, with the at least one processor, cause the network node at least to perform:

keeping track on traffic load;

determining, in response to receiving information on channel conditions from one or more user devices, based on the traffic load, available resources for traffic to and from the one or more user devices;

using, instead of normal resource allocation for higher priority traffic, the normal resource allocation being based on channel conditions indicated in the information on channel conditions, reliability increasing resource allocation for the higher priority traffic at least as long as there are, based on the traffic load, enough resources available; and shifting, in response to enough resources not being available and a mixed traffic load of higher priority traffic and non-higher priority traffic, resources from the non-higher priority traffic to the higher priority traffic, the shifting including allocating resources to the non-higher priority traffic assuming better channel conditions than those indicated in the information on channel conditions, and continuing the using the reliability increasing resource allocation for the higher priority traffic, wherein the shifting is performed by selecting a modulation coding scheme intended for better channel conditions than channel conditions indicated in the information on channel conditions received from the user device, wherein the shifting is performed by using higher channel quality index values than those indicated in the information on channel conditions received from user devices with non-higher priority traffic to select the modulation coding scheme.

9. A network node configured to provide wireless access, the network node comprising:

at least one processor; and at least one memory including computer program code;

the at least one memory and computer program code configured to, with the at least one processor, cause the network node at least to perform:

keeping track on traffic load;

determining, in response to receiving information on channel conditions from one or more user devices, based on the traffic load, available resources for traffic to and from the one or more user devices;

using, instead of normal resource allocation for higher priority traffic, the normal resource allocation being based on channel conditions indicated in the information on channel conditions, reliability increasing resource allocation for the higher priority traffic at least as long as there are, based on the traffic load, enough resources available;

treating ultra reliable low latency communications traffic as the higher priority traffic; and selecting amongst user devices with ultra reliable low latency communications traffic those user devices to which ultra reliable low latency communications traffic the reliability increasing resource allocation is used, wherein the selecting is performed based on reliability level of the information on channel conditions or based on reliability requirements of ultra reliable low latency communications service; and shifting, in response to enough resources not being available and a mixed traffic load of higher priority traffic and non-higher priority traffic, resources from the non-higher priority traffic to the higher priority traffic, the shifting including allocating resources to the non-higher priority traffic assuming better channel conditions than those indicated in the information on channel conditions, and continuing the using the reliability increasing resource allocation for the higher priority traffic.

10. A network node configured to provide wireless access, the network node comprising:
- at least one processor; and
- at least one memory including computer program code;
- the at least one memory and computer program code configured to, with the at least one processor, cause the network node at least to perform:
- keeping track on traffic load;
- determining, in response to receiving information on channel conditions from one or more user devices, based on the traffic load, available resources for traffic to and from the one or more user devices;
- determining whether the traffic is higher priority traffic or non-higher priority traffic based on reliability level of the information on channel conditions or based on quality of service requirements of the traffic or based on whether the traffic is ultra reliable low latency communications service traffic;
- using, instead of normal resource allocation for higher priority traffic, the normal resource allocation being based on channel conditions indicated in the information on channel conditions, reliability increasing resource allocation for the higher priority traffic at least as long as there are, based on the traffic load, enough resources available; and
- shifting, in response to enough resources not being available and a mixed traffic load of higher priority traffic and non-higher priority traffic, resources from the non-higher priority traffic to the higher priority traffic, the shifting including allocating resources to the non-higher priority traffic assuming better channel conditions than those indicated in the information on channel conditions, and continuing the using the reliability increasing resource allocation for the higher priority traffic.

* * * * *